Oct. 21, 1952   C. A. PYLE ET AL   2,614,817
MIXER FEEDER FOR FLOUR MILLS
Filed July 1, 1949   2 SHEETS—SHEET 2

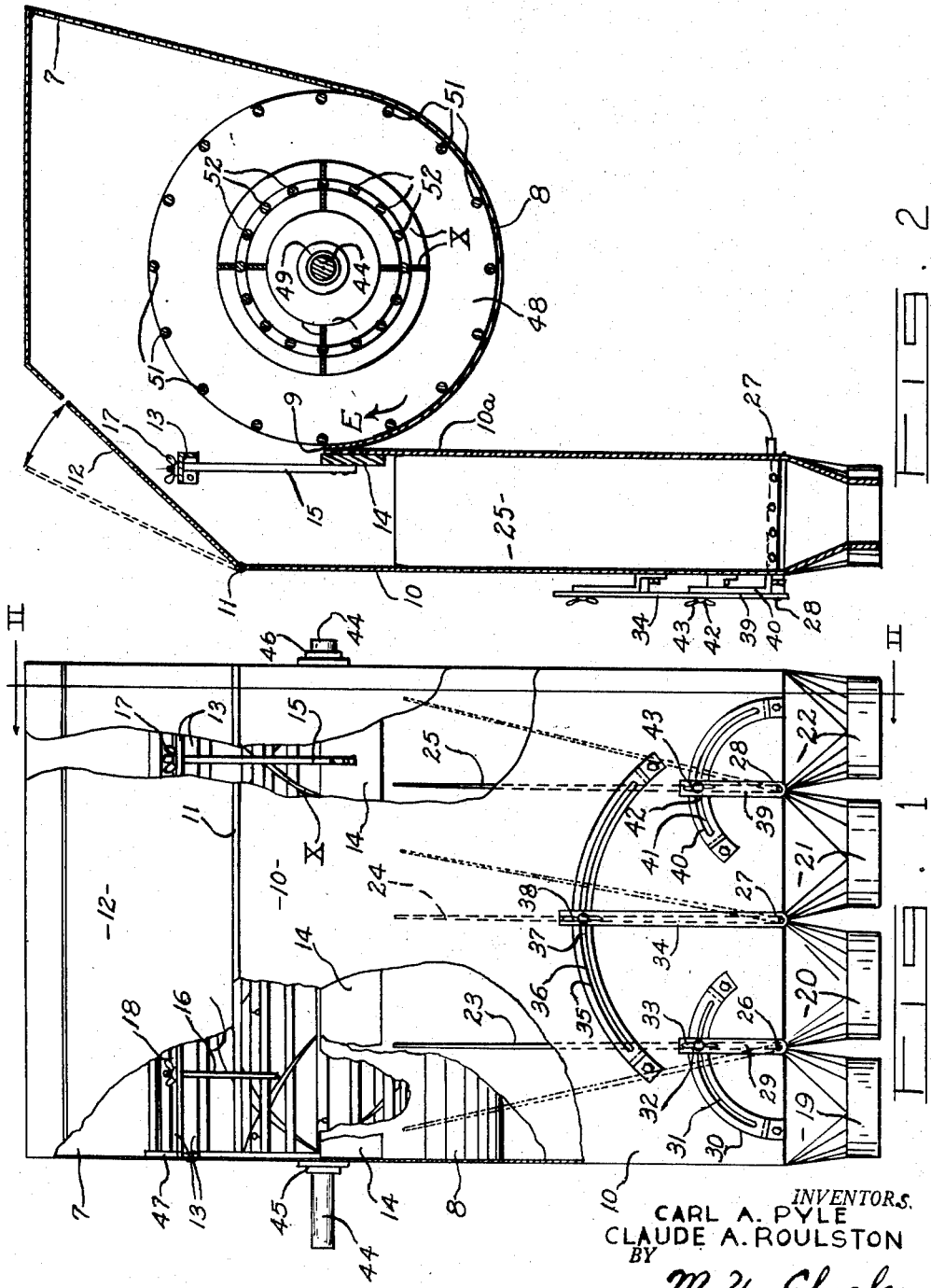

INVENTORS.
CARL A. PYLE
CLAUDE A. ROULSTON
BY M. Y. Charles
ATTORNEY.

UNITED STATES PATENT OFFICE 2,614,817

MIXER FEEDER FOR FLOUR MILLS

Carl A. Pyle and Claude A. Roulston, Wichita, Kans.

Application July 1, 1949, Serial No. 102,571

1 Claim. (Cl. 259—45)

Our invention relates to an improvement in mixer feeder devices for flour mills. An object of our invention is to provide a device of the kind mentioned that will receive a stream of grain or partially prepared grain in the process of making flour and evenly mix and spill the mix into a series of spouts that are adjustably dampered to make each spout carry a balanced or equal amount of the mix to the machines where the mix is to be further processed.

A further object of the invention is to provide a device of the kind mentioned that is simple, easy to manufacture, one that is inexpensive, one that is highly efficient in its work as well as one that is durable and long lived. These and other objects will be more fully explained as this description progresses.

Now referring to the accompanying drawings in which similar numerals of reference designate the same parts throughout the several figures of the drawings.

Fig. 1 is a detail sectional view through the device, parts being broken away for convenience of illustration.

Fig. 2 is a detail sectional view through the device, the view being as seen from the line II—II in Fig. 1 and looking in the direction of the arrows.

Figure 4:
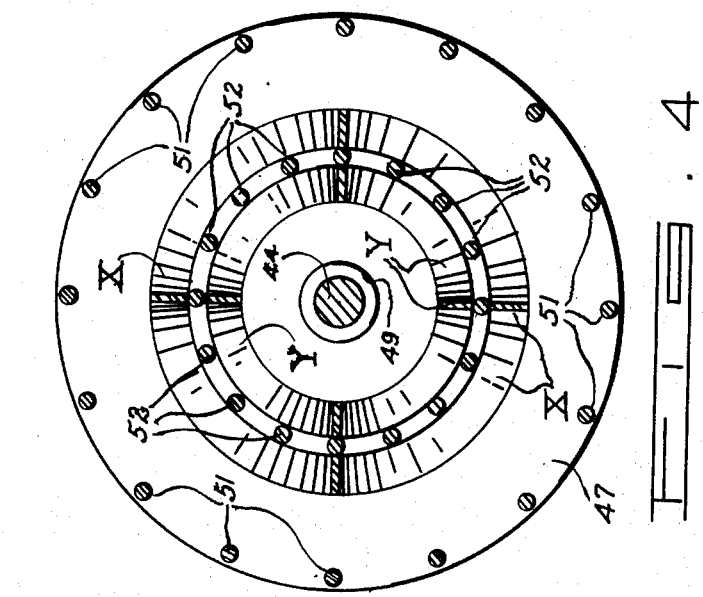
Fig. 4 is a detail sectional view through the mixing reel, the view being as seen from the line IV—IV in Fig. 3 and looking in the direction of the arrows.
Figure 3:
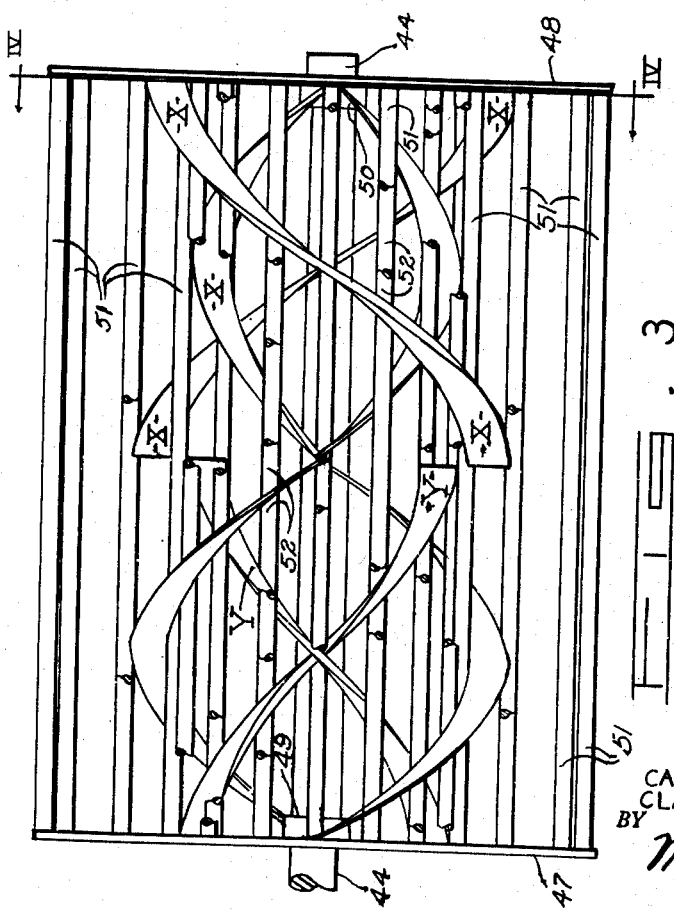
Fig. 3 is a front detail view of the mixing reel.

In the drawings the device is shown as having a receiving hopper 7 that merges into a depending round bottomed trough portion 8, the upper edge of one side of which lies in a horizontal plane that passes through the longitudinal center axis of the round bottom portion 8.

The device is provided with a long narrow chute 10 that is positioned at one side of the trough 8 and one side of which joins the trough 8 at the point 9, the other side of the chute 10 extends on upwardly to a point 11 where a door 12 is hingedly joined thereto and slopes rearwardly to cover the upper portion of the chute 10 and a part of the receiving hopper 7. The chute 10 is the same width as the length of the trough 8.

Beneath the door 12 and spanning the width of the chute 10 is an angle iron 13, the ends of which are rigidly attached to the end walls of the chute 10.

The device is provided with a trough depth governing plate 14 that is slidably positioned against the back wall 10a of the chute 10 and is adapted to be moved vertically so as to increase or decrease the depth of the trough 8.

The governing plate 14 is supported by a pair of rods 15 and 16, the lower ends of which are attached to the plate 14 and the upper ends of which slidably pass through the horizontal leg of the angle iron 13 and the upper ends of the rods 15 and 16 are threaded and wing nuts 17 and 18 are threaded, one on each rod 15 and 16 and bear on the horizontal leg of the angle iron 13 to support the plate 14 in adjusted elevated positions whereby the depth of the trough 8 is selectively adjusted.

The lower end of the chute 10 is divided and feeds into a series of duct nipples 19, 20, 21 and 22 to which tubular ducts (not shown) may be connected and lead to separate machines or points of discharge of the mix in the process of making flour.

In the chute 10 and below the plate 14 is a plurality of dampers 23, 24, 25 that are positioned transverse of the thickness of the chute 10, and extend to the bottom of the chute 10 where they are solidly mounted on pivot shafts 26, 27 and 28 that are pivotally carried by the front and rear walls of the chute 10 at points intermediate the duct nipples 19 and 20, 20 and 21, 21 and 22.

On the front end of the pivot shaft 26 is an upwardly extending lever 29, the lower end of which is rigidly attached to, or mounted on the pivot shaft 26. The upper end of the lever 29 is swingable over an arcuate adjustment element 30, the ends of which are rigidly attached to the front wall of the chute 10 to hold the arcuate element 30 in a centered position about the shaft 26. The arcuate element 30 has an arcuate slot 31 therein and a carriage type bolt 32 is passed through the slot 31 and slidably passed through the upper end of the lever 29 so that the square shank of the bolt 32 is slidably positioned in the slot 31 and a wing nut 33 is threaded on the bolt 32 whereby the lever 29 may be rocked to selected adjusted positions over the arcuate element 30 and by screwing the wing nut 33 on the bolt 32, it may be turned to tighten the upper end of the lever 29 against the arcuate member 30 to bind and hold the lever 29 and its associated damper 23 in their adjusted position relative to the nipples 19 and 20.

On the front end of the pivot shaft 27 is an upwardly extending lever 34, the lower end of which is rigidly attached to, or mounted on the pivot shaft 27. The upper end of the lever 34 is swingable over an arcuate adjustment element 35, the ends of which are rigidly attached to the front wall of the chute 10 to hold the arcuate element 35 in a centered position about the shaft 27. The arcuate element 35 has an arcuate slot 36 therein, and a carriage type bolt 37 is passed through the slot 31 and slidably passed through the upper end of the lever 34 so that the square shank of the bolt 37 is slidably positioned in the slot 36 and a wing nut 38 is threaded on the bolt 37 whereby the lever 34 may be rocked to selected adjusted positions over the arcuate element 35 and by screwing the wing nut 38 on the bolt 37 the upper end of the lever 34 may be tightened against the arcuate member 35 to bind and hold the lever 34 and its associated damper 24 in their adjusted position relative to the nipples 20 and 21.

On the front end of the pivot shaft 28 is an upwardly extending lever 39, the lower end of which is rigidly attached to, or mounted on the pivot shaft 28. The upper end of the lever 39 is swingable over an arcuate adjustment element 40, the ends of which are rigidly attached to the front wall of the chute 10 to hold the arcuate element 40 in a centered position about the shaft 28. The arcuate element 40 has an arcuate slot 41 therein, and a carriage type bolt 42 is passed through the slot 41 and slidably passed through the upper end of the lever 39 so that the square shank of the bolt 42 is slidably positioned in the slot 41 and a wing nut 43 is threaded on the bolt 42, whereby the lever 39 may be rocked to selected adjusted positions over the arcuate element 40 and by screwing the wing nut 43 on the bolt 42 the upper end of the lever 39 may be tightened against the arcuate element 40 to bind and hold the lever 39 and its associated damper 35 in their adjusted position relative to the nipples 21 and 22.

In the trough 8 is revolvably positioned a combination mixing, distributing and ejecting reel that is rigidly mounted on a shaft 44 that is revolvably carried in bearings 45 and 46 that are carried on the end walls of the trough 8.

The construction of the said reel is as follows: The reel is provided with circular end plates 47 and 48 having inwardly extending hub portions 49 and 50 that are integrally formed thereon and are rigidly mounted on and attached to the shaft 44 and are spaced apart so as to be positioned, one immediately adjacent each end wall of the trough 8. The reel is provided with a multiplicity of rods 51 that extend between and are attached to and are equally spaced around the outer edges of the end plates 47 and 48.

The reel is provided with a second multiplicity of circular positioned and equally spaced apart rods 52 that are positioned substantially midway between the outer edges of the end plates 47 and 48 and the center thereof and the ends of the rods 52 are rigidly attached to the end plates 47 and 48.

The reel is provided with a series of spiral blades that are divided into two groups, one of which is directed in one direction around the reel and the other is directed in the opposite direction around the reel and each reel blade is made in two pieces X and Y, one of which is positioned on and rigidly attached to the outside of the rods 52, and the other of which is carried by and is rigidly attached to the inner sides of said rods 52 so that each blade starts on the inner side of the rods 52 and continues to the center of the rod 52 from where it continues on the outside of the rods 52 to the opposite end of the reel. This construction is common in all of the blades regardless to which direction they are directed.

The operation of the device is as follows: The stock to be mixed and distributed is delivered into the hopper 7 and falls into the trough 8 to fill the trough 8 and as the reel revolves, the material that has fallen therein is mixed by the rods 51 and as the trough further fills the blades X and Y engage the material in the trough 8 and impart opposing endway traveling motion relative to the length of the trough wherein the material in the trough is moved from end to end of the trough and during the end to end movement the stock is thoroughly mixed by the spiral movement of the mixing blades X and Y and as the trough fills and the contents thereof has been thoroughly mixed and distributed, the rods 51 traveling in the direction of the arrow E will raise that portion of the material adjacent the edge 9 of the trough 8 or the upper edge of the plate 14 and raise it sufficiently that it will spill over the upper edge of the plate 14 and fall in a substantially uniform sheet, into the chute 10, where it may contact the dampers 23, 24, and 25, which have been previously properly adjusted to divide the following sheet of grain into equally divided streams that will flow, one through each of the nipples 19, 20, 21 and 22 and ducts (not shown) connected thereto, to their predetermined destination.

While the device as shown and described is probably the preferred form of the device, it is to be understood that such modifications may be employed as lie within the scope of the appended claim without departing from the spirit and intention of the invention.

Now having fully shown and described our invention, what we claim is:

In a mixer, feeder and distributor device of the kind described, said device having a combination material receiving and discharging trough therein, said trough having means therein for mixing and distributing the said material in the trough, and finally moving the material to spill in an even sheet over one edge of the trough, said means for mixing, distributing and spilling said material being a reel, said reel being rigidly carried on a shaft, said shaft being revolvable by power outside the trough, said reel having a pair of end plates and a series of elements spaced apart and connecting between said end plates and being positioned adjacent the edges of the end plates, a second series of supporting and spaced apart elements connecting between said end plates and being located in a circular position intermediate the first said series of elements connecting between the said end plates and the center of said plates, the second said series of supporting elements having two groups of spirally positioned blades thereon, said groups of blades being directed in opposing directions, each group of spiral blades being divided into two sections that are positioned, one on the outside and the other on the inside of the circle of the second said series of supporting elements connecting between the said end plates.

CARL A. PYLE.
CLAUDE A. ROULSTON.

REFERENCES CITED

The following references are of record in the file of this patent:

UNITED STATES PATENTS

| Number | Name | Date |
|---|---|---|
| 92,262 | Burton | July 6, 1869 |
| 326,447 | Holden et al. | Sept. 15, 1885 |
| 339,454 | McWhorter | Apr. 6, 1886 |
| 750,628 | Fay | Jan. 26, 1904 |
| 1,267,241 | McCaughey | May 21, 1918 |
| 1,563,101 | Offenhauser | Nov. 24, 1925 |
| 1,714,830 | Wadsworth | May 28, 1929 |
| 1,959,465 | Dryfoos | May 22, 1934 |

FOREIGN PATENTS

| Number | Country | Date |
|---|---|---|
| 257,135 | Germany | Feb. 28, 1912 |